US009295007B2

(12) United States Patent
Park et al.

(10) Patent No.: US 9,295,007 B2
(45) Date of Patent: Mar. 22, 2016

(54) METHOD FOR DETERMINING UPLINK TRANSMISSION POWER AND USER EQUIPMENT

(75) Inventors: Sungho Park, Anyang-si (KR); Jinyoung Chun, Anyang-si (KR); Kitae Kim, Anyang-si (KR); Sunam Kim, Anyang-si (KR); Jiwon Kang, Anyang-si (KR); Binchul Ihm, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 14/116,723

(22) PCT Filed: May 10, 2012

(86) PCT No.: PCT/KR2012/003651
§ 371 (c)(1),
(2), (4) Date: Nov. 8, 2013

(87) PCT Pub. No.: WO2012/153984
PCT Pub. Date: Nov. 15, 2012

(65) Prior Publication Data
US 2014/0094216 A1    Apr. 3, 2014

Related U.S. Application Data

(60) Provisional application No. 61/484,637, filed on May 10, 2011.

(51) Int. Cl.
| | | |
|---|---|---|
| *H01Q 11/12* | (2006.01) | |
| *H04W 52/24* | (2009.01) | |
| *H04W 52/40* | (2009.01) | |
| *H04W 24/08* | (2009.01) | |
| *H04W 52/14* | (2009.01) | |

(52) U.S. Cl.
CPC .......... *H04W 52/242* (2013.01); *H04W 24/08* (2013.01); *H04W 52/40* (2013.01); *H04W 52/146* (2013.01)

(58) Field of Classification Search
CPC .......... H04W 52/242; H04W 52/146; H04W 52/244; H04W 52/04; H04W 52/10; H04W 52/143; H04W 52/08; H04W 52/248; H04W 76/026
USPC .................... 455/69, 522, 504, 506, 127.2
See application file for complete search history.

(56) References Cited

U.S. PATENT DOCUMENTS

| 6,600,772 B1 | 7/2003 | Zeira et al. | |
| 2011/0134759 A1* | 6/2011 | Kim et al. ................ 370/242 |

FOREIGN PATENT DOCUMENTS

| KR | 20090097805 | 9/2009 |
| KR | 20090105295 | 10/2009 |
| KR | 20100006144 | 1/2010 |
| WO | 2010/107885 | 9/2010 |

OTHER PUBLICATIONS

PCT International Application No. PCT/KR2012/003651, Written Opinion of the International Searching Authority dated Nov. 28, 2012, 14 pages.

(Continued)

*Primary Examiner* — Tu X Nguyen
(74) *Attorney, Agent, or Firm* — Lee, Hong, Degerman, Kang & Waimey

(57) ABSTRACT

The present invention provides a method and apparatus for determining uplink transmission power, and a method and apparatus for uplink power control. The base station of the present invention provides user equipment (UE) with UE specific weights for downlink path loss for uplink power control when the UE simultaneously transmits signals using a plurality of nodes. The UE then determines uplink transmission power by applying the UE-specific weights to the downlink path loss.

2 Claims, 5 Drawing Sheets

METHOD FOR DETERMINING UPLINK TRANSMISSION POWER AND USER EQUIPMENT

CROSS-REFERENCE TO RELATED APPLICATIONS

This application is the National Stage filing under 35 U.S.C. 371 of International Application No. PCT/KR2012/003651, filed on May 10, 2012, which claims the benefit of U.S. Provisional Application Ser. No. 61/484,637, filed on May 10, 2011, the contents of which are hereby incorporated by reference herein in their entirety.

TECHNICAL FIELD

The present invention relates to a wireless communication system. More specifically, the present invention relates to a method and apparatus for determining uplink transmit power and a method and apparatus for controlling uplink transmit power.

BACKGROUND ART

With appearance and spread of machine-to-machine (M2M) communication and a variety of devices such as smartphones and tablet PCs demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have developed.

Meanwhile, a communication environment has evolved into increasing density of nodes accessible by a user at the periphery of the nodes. A communication system including high-density nodes may provide a better communication service to the user by cooperation between the nodes. Such a multi-node cooperation communication scheme performing communication with a user equipment (UE) using the same time-frequency resource in plurality of nodes provides much better performance than a conventional communication scheme in which each node operates as an independent BS to perform communication with the UE without mutual cooperation.

As opposed to a conventional centralized antenna system (CAS) (i.e. a single node system) in which antennas are centralized in a BS, a plurality of nodes in a multi-node system is generally separated by a predetermined interval or more. The plurality of nodes may be managed by one or more BSs or BS controllers for controlling operation of each node or scheduling data to be transmitted/received through each node. Each node is connected via a cable or a dedicated line to the BSs or BS controller for managing the node.

Such a multi-node system may be considered a sort of a MIMO system in that distributed nodes may communicate with a single UE or plurality of UEs by simultaneously transmitting/receiving different data streams. Nonetheless, signals are transmitted using nodes distributed at various positions in the multi-node system and thus a transmission region that should be covered by each antenna is reduced relative to antennas included in the conventional CAS. Accordingly, compared with a conventional system implementing MIMO technology in the CAS, transmit power needed when each antenna transmits signals may be reduced in the multi-node system. In addition, since the transmission distance between the antenna and the UE is shortened, path loss is reduced and data can be transmitted at high rate. Then, transmission capacity and power efficiency of a cellular system can increase and communication performance of relatively uniform quality can be achieved irrespective of position of a user in a cell. In the multi-node system, a BS(s) or a BS controller(s) connected to a plurality of nodes cooperatively performs data transmission/reception and therefore signal loss generated in a transmission process is reduced. If nodes separated by a predetermined distance or more cooperatively perform communication with the UE, correlation and interference between antennas is also reduced. Therefore, according to a multi-node cooperative communication scheme, a high signal to interference-plus-noise ratio (SINR) can be obtained.

Due to such advantages of the multi-node system, the multi-node system is used together with or replaces the conventional CAS to emerge as a new base of cellular communication, in order to reduce costs for installing more BSs and maintaining a backhaul network in a next-generation mobile communication system and to improve extend coverage improve SINR.

DETAILED DESCRIPTION OF THE INVENTION

Technical Problems

In a conventional wireless communication system, an uplink power control scheme has been provided on the premise that a UE receives/transmits a downlink/uplink signal from/to one node. That is, in the conventional uplink power control scheme, characteristics of a multi-node system have not been considered. Therefore, a new uplink power control scheme for the multi-node system is needed.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for determining power for uplink transmission to a base station by a user equipment for simultaneously transmitting signals to a plurality of nodes, the method including receiving uplink power control information from the base station; and determining an uplink transmit power P based on the uplink power control information, wherein the uplink power control information includes a user equipment-specific weight applied to downlink pathloss of the plurality of nodes.

In another aspect of the present invention, provided herein is a user equipment for determining power for uplink transmission to a base station, the user equipment simultaneously transmitting signals to a plurality of nodes and including a radio frequency (RF) unit configured to transmit and receive radio signals; and a processor configured to control the RF unit, wherein the processor controls the RF unit to receive uplink power control information from the base station and determines an uplink transmit power P based on the uplink power control information, and wherein the uplink power control information includes a user equipment-specific weight applied to downlink pathloss of the plurality of nodes.

In each aspect of the present invention, the uplink power control information may include a cell-specific weight.

In each aspect of the present invention, the uplink transmit power P may be determined based on the following Equation 1 or Equation 2:

$$P = \min\{P_{CMAX}, A + \alpha \cdot \alpha' \cdot PL\} \text{ (dBm)} \quad \text{[Equation 1]}$$

$$P = \alpha' \cdot L + B \text{ (dBm)} \quad \text{[Equation 2]}$$

wherein, in Equation 1, A is a value determined based on one or more power control parameters provided by the base station, PL is the downlink pathloss measured by the user equipment, α is the cell-specific weight, and α' is the user equipment specific weight and, in Equation 2, P is a transmit power of an uplink data channel, L corresponds to downlink propagation loss including the downlink pathloss, calculated by the user equipment, α' is the user equipment specific weight, and B is a value determined based on one or more power control parameters provided by the base station.

In each aspect of the present invention, the uplink transmit power P may be determined based on the following Equation 3 or Equation 4:

$$P = \min\{P_{CMAX}, A + \alpha' \cdot PL\} \text{ (dBm)} \quad \text{[Equation 3]}$$

$$P = \alpha' \cdot L + B \text{ (dBm)} \quad \text{[Equation 4]}$$

wherein, in Equation 3, A is a value determined based on one or more power control parameters provided by the base station, PL is the downlink pathloss measured by the user equipment, and α' is the user equipment specific weight and, in Equation 4, P is a transmit power of an uplink data channel, L corresponds to downlink propagation loss including the downlink pathloss, calculated by the user equipment, α' is the user equipment specific weight, and B is a value determined based on one or more power control parameters provided by the base station.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink power can be more efficiently controlled in a wireless communication system supporting multi-node communication.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
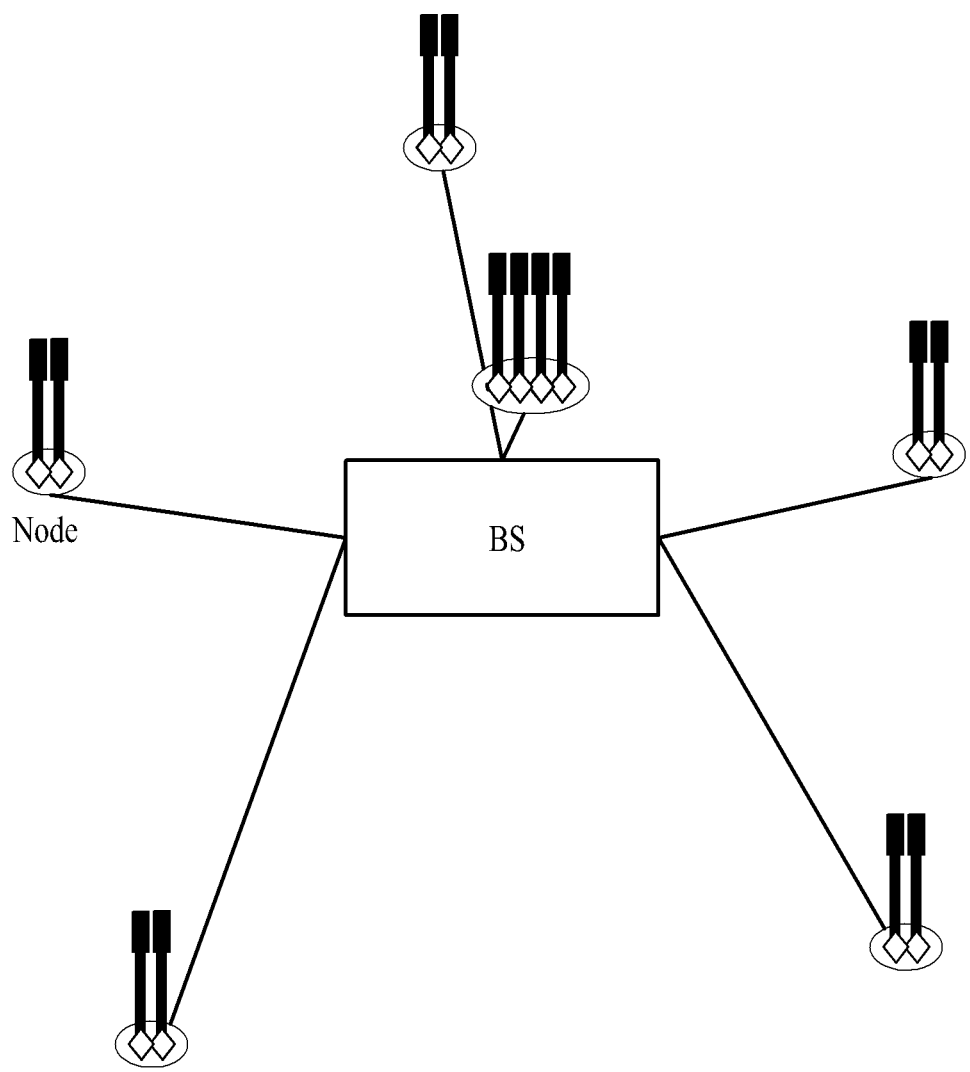
FIG. 1 illustrates an exemplary configuration of a multi-node system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) denotes a fixed or mobile type terminal. Examples of the UE include various devices that transmit and receive user data and/or various kinds of control information to and from a base station. The UE may be referred to as a terminal equipment (TE), a mobile station (MS), a mobile terminal (MT), a user terminal (UT), a subscriber station (SS), a wireless device, a personal digital assistant (PDA), a wireless modem, or a handheld device. In addition, in the present invention, a base station (BS) means a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), or a processing server (PS).

In the present invention, a frame refers to a structured data sequence having a fixed duration, used by a few physical layer (PHY) standards. One frame may include a predetermined number of subframes and one subframe may include one or more slots. One subframe/slot may be configured to include a plurality of orthogonal frequency division multiplexing (OFDM) symbols in the time domain. For example, one subframe may be composed of two slots, each of which includes 7 OFDM symbols. The number of subframes per frame, the number of slots per subframe, and the number of OFDM symbols per slot are determined according to PHY standards of an associated system. For instance, one slot of a 3GPP LTE(-A) system includes 7 OFDM symbols in the case of a normal cyclic prefix (CP) and 6 OFDM symbols in the case of an extended CP. A subframe/slot includes a plurality of resource blocks (RBs) or resource units (RUs) in the frequency domain. Particularly, one RB in the 3GPP LTE(-A) system occupies one slot in the time domain and 12 consecutive subcarriers in the frequency domain. For reference, a time-frequency resource composed of one OFDM symbol and one subcarrier in the 3GPP LTE(-A) system is referred to as a resource element (RE).

Hereinafter, a time-frequency resource or RE that is assigned to transmit a physical uplink control channel (PUCCH)/physical uplink shared channel (PUSCH) will be referred to as a PUCCH/PUSCH RE. In the present invention, a PUCCH/PUSCH refers to a set of time-frequency resources carrying uplink control information/data. In the present invention, PUCCH/PUSCH transmission of a UE refers to transmission of an uplink control/data signal on a PUCCH/PUSCH.

In the present invention, if a specific signal is allocated to a frame/subframe/slot/carrier/subcarrier, this means that the specific signal is transmitted through a corresponding carrier/subcarrier during duration/timing of a corresponding frame/subframe/slot/symbol.

Meanwhile, in the present invention, a cell refers to a prescribed geographic region to which one BS or node(s) provides a communication service. Hence, in the present invention, communication with a specific cell may mean communication with a BS or a node that provides a communication service to the specific cell. Moreover, a downlink/uplink signal of a specific cell refers to a downlink/uplink signal from/to a BS or a node that provides a communication service to the specific cell. In addition, a channel state/quality of a specific cell refers to a channel state/quality of a channel or a communication link formed between a BS or a node and a UE that provides a communication service to the specific cell.

FIG. 1 illustrates an exemplary configuration of a multi-node system. Specifically, FIG. 1 illustrates a distributed multi-node system (DMNS) among multi-node systems.

Referring to FIG. 1, in the DMNS, a plurality of nodes separated by a predetermined interval or more in a prescribed geographic region is connected to one BS or BS controller through cables or dedicated lines. That is, one controller manages transmission/reception through all nodes located within the prescribed geographic region.

In the DMNS, if nodes have the same cell identifier (ID), i.e. if the same cell ID is used for signal transmission through the nodes, each node operates as a partial antenna group of one cell in the DMNS. In the DMNS, each node may be assigned an additional node ID or may operate as partial antennas in a cell without the additional node ID.

On the other hand, if nodes in the DMNS have different cell IDs, the DMNS may be regarded as a multi-cell (e.g. macro-cell/femto-cell/pico-cell) system. If multiple cells formed by each of a plurality of nodes are configured in an overlaid form according to coverage thereof, a network formed by the multiple cells is particularly referred to as a multi-tier network.

Meanwhile, only a distributed antenna or antenna group cannot always be a node. Various types of BSs may be used as nodes irrespective of names thereof. That is, a BS, an NB, an eNB, a pico-cell eNB (PeNB), a home eNB (HeNB), a relay, a repeater, etc. may form a node. In addition, devices other than the BS can become a node. For example, a radio remote head (RRH) or a radio remote unit (RRU) may be a node. At least one antenna is installed per node. The antenna may refer to a physical antenna or refer to an antenna port, a virtual antenna, or an antenna group. A node may also be referred to as a point. Hereinafter, a node separated by a prescribed distance from the BS, rather than a node at which a BS to which a UE is connected is located, will be referred to as a distributed node (dNode).

In FIG. 1, one controller manages transmission/reception through all nodes within a prescribed geographic region. However, nodes performing cooperative communication need not always be managed by one controller. Embodiments of the present invention may be applied even when nodes controlled by different BSs or different BS controllers perform cooperative communication. That is, in the multi-node system according to the present invention, one or more BSs or BS controllers connected to a plurality of nodes may control the plurality of nodes to simultaneously transmit signals to a UE or simultaneously receive signals from the UE, through a portion among the plurality of nodes. Hereinafter, a node that transmits a downlink signal to a UE or receives an uplink signal from the UE will be referred to as a serving node.

Although there are differences between multi-node systems according to a substantial type of each node, i.e. an implementation form of each node, the multi-node systems differ from single-node systems (e.g. a CAS, conventional MIMO system, conventional relay system, conventional repeater system, etc.) in that multiple nodes participate in providing a communication service to a UE on a prescribed time-frequency resource. Accordingly, embodiments of the present invention related to a method for performing cooperative data transmission using some or all of a plurality of nodes may be applied to various types of multi-node systems. For example, while a node generally refers to an antenna group separated from another node by a prescribed interval or more, the embodiments of the present invention may be applied even when a node refers to an arbitrary antenna group irrespective of the interval. For example, if a BS includes a cross-polarized (X-pol) antenna, the embodiments of the present invention may be applied by interpreting that the BS controls a node composed of a horizontally-polarized (H-pol) antenna and a node composed of a vertically-polarized (V-pol) antenna.

A scheme capable of transmitting/receiving data through a plurality of transmission (Tx)/reception (Rx) nodes is referred to as multi-BS MIMO or coordinated multi-point Tx/Rx (CoMP). Among cooperative communication schemes between nodes, a cooperative transmission scheme may be categorized into joint processing (JP) and scheduling coordination. The former may be divided into joint transmission (JT) and dynamic cell selection (DCS) and the latter may be divided into coordinated scheduling (CS) and coordinated beamforming (CB). Relative to other cooperative communication schemes, more various communication environments may be formed when JP, among the cooperative communication schemes between nodes, is performed.

Figure 2:
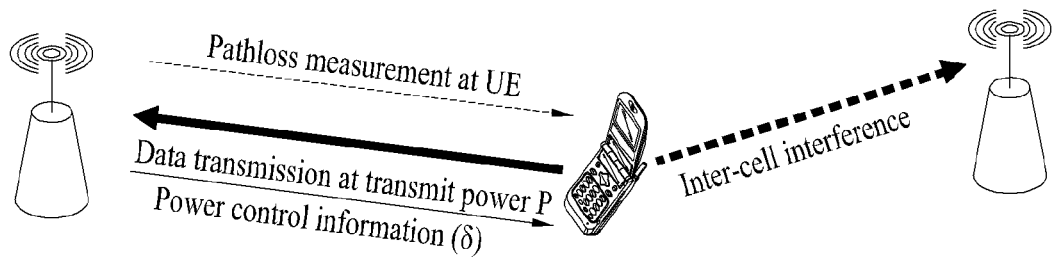
FIG. 2 is a view explaining a basic concept of uplink power control.

FIG. 2 is a view explaining a basic concept of uplink power control.

In a wireless communication system, a power control scheme is used as one method for reducing pathloss or propagation loss according to the distance between a BS and a UE and reducing inter-cell interference caused by interference from neighboring cells. The power control scheme refers to a scheme for controlling transmit power so as to transmit data at the lowest power level while maintaining quality of service (QoS) of a wireless communication system to some degree. Especially, UEs in the vicinity of a cell edge in a multi-cell environment are influenced by pathloss and inter-cell interference. A UE should determine a proper transmit power P to transmit data so as not to deteriorate QoS according to pathloss while preventing interference with a contiguous cell. To this end, upon entering a network of a BS, generally, a UE receives antenna information of the BS from the BS or acquires the antenna information through detection of downlink control information. The UE measures receive power thereof (e.g. a received signal strength indicator (RSSI) or pathloss (or propagation loss)) for a downlink signal transmitted by the BS, using a reference signal of each cell (e.g. a preamble, a MIMO midamble, a cell-specific reference signal (CRS), or a channel state information reference signal (CSI-RS) in a downlink frame). The UE calculates uplink transmit power by factoring in downlink pathloss instead of uplink pathloss because the UE cannot directly calculate the uplink pathloss. The UE may calculate the uplink transmit power P for target SINR, target interference over thermal (IoT), etc. using receive power measured thereby, downlink pathloss, and power control information δ such as noise and interference level (NI) provided by the BS.

In a conventional single-node system, uplink multi-user MIMO (MU-MIMO) is performed such that UEs share the same frequency/time resource region with respect to a node of one point and transmit corresponding uplink data to the node in the same frequency/time resource region. In contrast, in a DMNS, each UE may transmit/receive signals to/from one or more nodes. In the DMNS, uplink MU-MIMO may be performed such that UEs may share the same frequency/time resource with respect to different nodes and each UE may transmit corresponding uplink data to one or more nodes to which the corresponding UE is connected on the same frequency/time resource. In this case, since the nodes of the DMNS are separated by a prescribed distance or more, the distance and link characteristics between each node and the UE are different.

Figure 3:
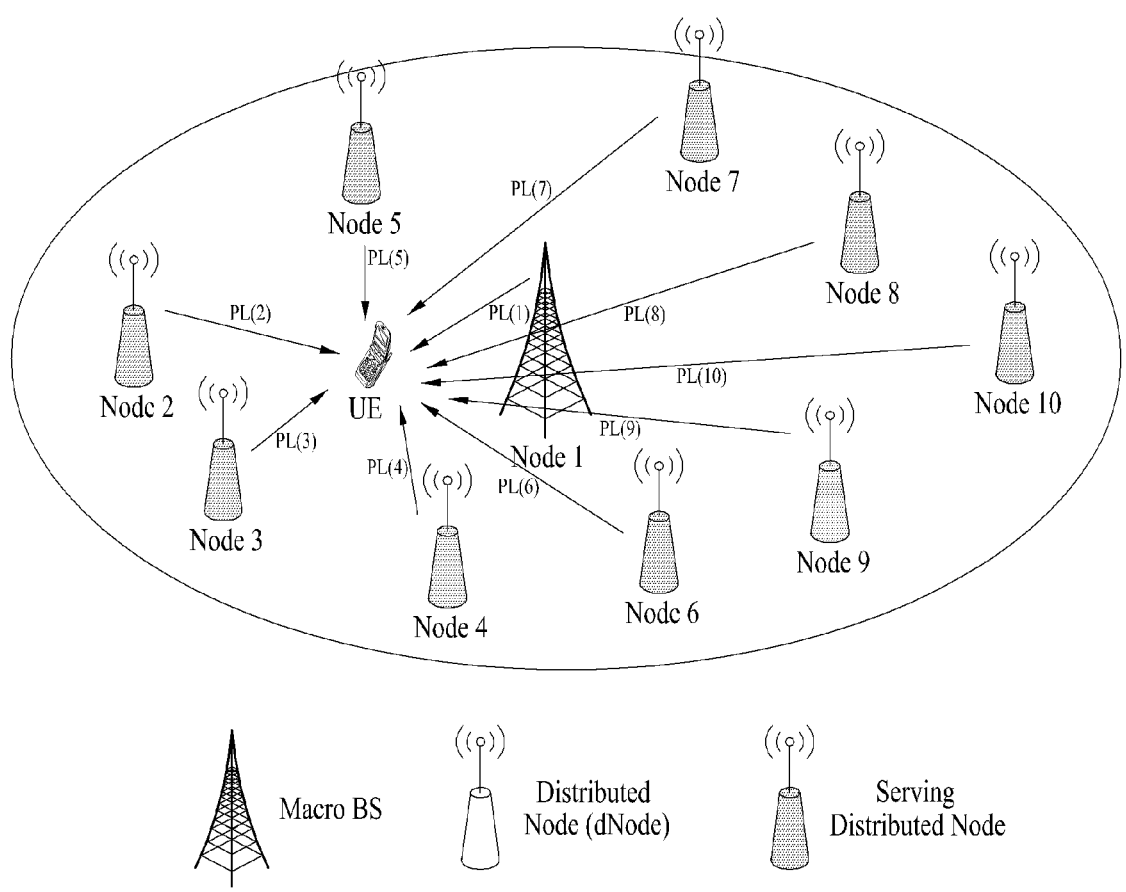
FIGS. 3 and 4 illustrate examples of deployment of a distributed multi-node system (DMNS).
Figure 4:
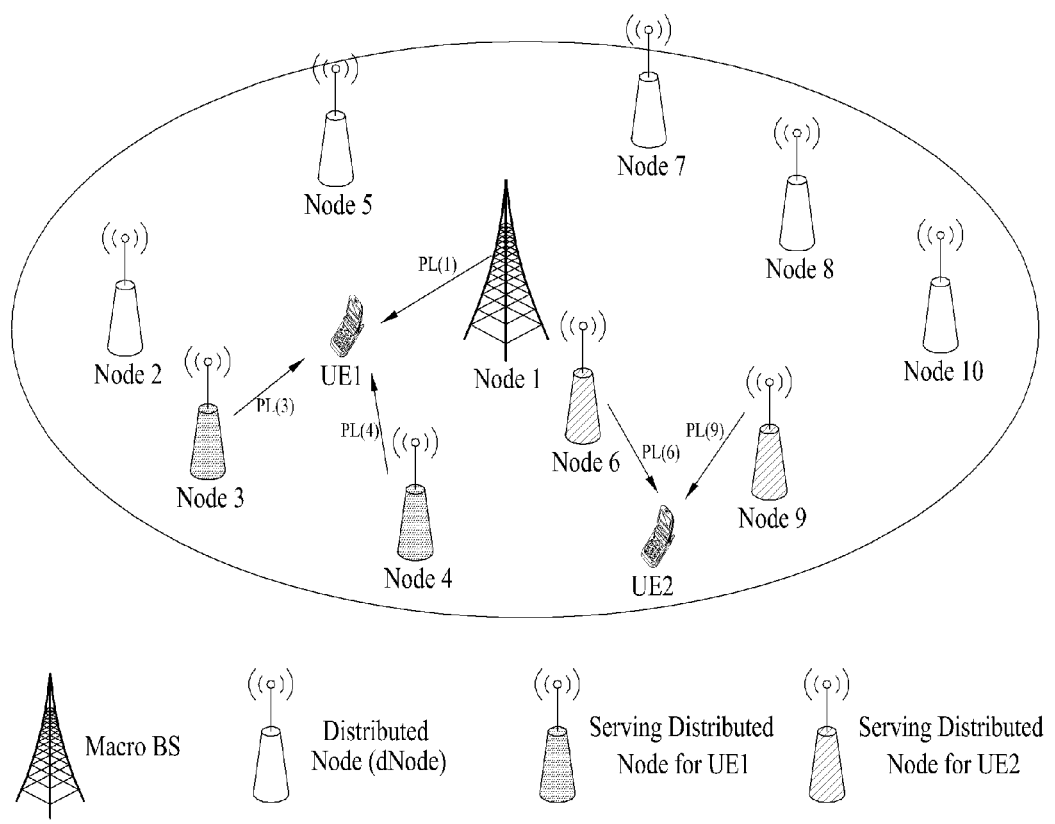

FIGS. 3 and 4 illustrate examples of deployment of a DMNS. Specifically, FIG. 3 illustrates a DMNS in which all nodes within coverage of a macro cell operate as serving nodes and FIG. 4 illustrates a DMNS in which a partial node(s) within the coverage of a macro cell operate as serving nodes. A macro cell refers to an area to which a communication service is provided by a macro BS having high transmit power and has relatively wide coverage. For reference, a micro cell refers to an area to which a communication service is provided by a micro BS, which is a small-scale version of the macro BS. The micro BS may independently operate while performing most of the functions of the macro BS. The micro BS may be installed in an area covered by the macro BS or may be installed in a shadow area that cannot be covered by the macro BS.

Referring to FIG. 3, a UE may receive/transmit signals from/to all nodes located within prescribed coverage. The UE estimates downlink pathlosses from the all nodes and calculates uplink transmit powers for all of the estimated pathlosses. In this case, pathloss from each node to the UE may have a significant deviation according to the distance between the UE and each node and to a channel environment. Accordingly, if a CRS based pathloss estimation method and uplink transmit power calculation method, which are applied to the conventional single-node system, are used in the DMNS, an estimated pathloss becomes the mean of the pathlosses from the respective nodes or a constant multiple of the mean, thereby increasing deviation in uplink transmit power.

Referring to FIG. 4, some nodes capable of maximizing uplink transmit amount of a UE may be selected as uplink serving nodes. In this case, there is a high probability that a node(s) adjacent to the UE is selected as a serving node. For example, referring to FIG. 4, Node 1, Node 3, and Node 4 may be selected or configured as serving nodes of UE 1 and Node 6 and Node 9 may be selected or configured as serving nodes of UE 2. When nodes adjacent to the UE may be adopted as serving nodes, the difference in channel link quality (e.g. pathloss, RSRP, RSRQ, etc.) of the serving nodes may be small. However, since the serving nodes may differ in terms of scheduling method, node selection method, channel environment, etc. and UEs in a cell may have different serving nodes, pathloss and link characteristics between the UE and the serving node(s) may still differ even though a node(s) contiguous to a UE is selected as the serving node(s) of the UE. That is, pathloss and link characteristics of the DMNS may be regarded as being UE-specific rather than cell-specific. Therefore, in the DMNS, if the UE estimates an uplink channel and calculates uplink transmit power using a conventional scheme, unbalance in received SNR per reception node of uplink becomes severe and it is difficult to control an NI for other cells or other nodes. This leads to uplink performance deterioration. Accordingly, the present invention proposes a new uplink power control method capable of being applied to the DMNS. Especially, the present invention provides embodiments in which link characteristics and pathloss between each serving node and a UE in the DMNS are reflected in determining uplink transmit power.

As described earlier, a UE of a legacy single-node system has estimated pathloss using a CRS and calculated uplink transmit power based on the estimated pathloss. That is, the UE in the single-node system cell-specifically calculates downlink pathloss and calculates uplink transmit power. If this is applied to the DMNS, the UE cannot calculate accurate pathloss for a serving node(s) per UE and thus cannot calculate uplink transmit power. Hence, the present invention provides a UE-specific weight (hereinafter, α') for a node per UE or a node group per UE, in order for the UE to effectively calculate uplink transmit power even if pathloss is estimated using a CRS in the DMNS. If a UE is implemented according to a legacy system (hereinafter, such a UE is referred to as a legacy UE), the legacy UE calculates uplink transmit power according to a legacy scheme and, if a UE is implemented according to the DMNS (hereinafter, such a UE is referred to as a DMNS UE), the DMNS UE calculates uplink transmit power using the UE-specific weight α'. For example, the DMNS UE may determine transmit power of an uplink channel using the following Equation 1 or Equation 2, within the range of maximum output power thereof or maximum permissible power for uplink channel transmission.

$$\rho \cdot PL + A \quad \text{[Equation 1]}$$

In Equation 1, A is a value determined based on one or more power control parameters provided by a BS. The one or more power control parameters may include a cell-specific parameter and/or a UE-specific parameter. PL denotes pathloss or propagation loss measured by a UE and ρ is a weight indicating how much downlink pathloss measured by the UE is reflected in uplink transmit power. Specifically, in the present invention, ρ is determined by a UE-specific weight α' or by the product of a cell-specific weight α and the UE-specific parameter α'. The BS maintains/transmits the legacy cell-specific weight α for the legacy UE, thereby guaranteeing backward compatibility with a legacy system. The newly added UE-specific parameter α' in the present invention may be expressed as a value in dB within the range of [0, N]. Here, N may be an integer or a real number greater than 1. Hereinafter, an example in which the present invention is applied to a 3GPP LTE(-A) system and an example in which the present invention is applied to an IEEE 802.16 system will be described.

<3GPP LTE(-A) System>

In the 3GPP LTE(-A) system, uplink power control serves to control a mean power during a predetermined time period, for example, one OFDM symbol, of a corresponding physical channel (e.g. a PUSCH, PUCCH, sounding reference signal (SRS), etc.). A legacy UE of the 3GPP LTE(-A) system determines transmit power for PUSCH transmission according to the following.

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \quad \text{[Equation 2]}$$

In Equation 2, i denotes a time index (or a subframe index) and the unit of $P_{PUSCH}(i)$ is dBm. In Equation 2, $P_{CMAX}$ is a configured UE transmit power and the UE is permitted to set the UE configured maximum transmit power $P_{CMAX}$. $M_{PUSCH}(i)$ is the bandwidth of PUSCH resource assignment expressed in number of resource blocks and may have a value from 1 to 110. $M_{PUSCH}(i)$ is updated every subframe. $P_{O\_PUSCH}(j)$ is a parameter composed of the sum of a cell-specific nominal component $P_{O\_NOMINAL\_PUSCH}(j)$ and a UE-specific component $P_{O\_UE\_PUSCH}(j)$. The cell-specific nominal component $P_{O\_NOMINAL\_PUSCH}(j)$ and the UE-specific component $P_{O\_UE\_PUSCH}(j)$ are provided by higher layers for j=0 and j=1. For PUSCH (re)transmission corresponding to semi-persistent grant, j=0 and, for PUSCH (re) transmission corresponding to a dynamic scheduled grant, j=1. $\Delta_{TF}(i)$ is a value determined by the UE-specific parameter provided by higher layers. f(i) is a UE-specific parameter controlled by a BS and may be defined as follows.

$$f(i)=f(i-1)+\delta_{PUSCH}(i-K_{PUSCH})$$ [Equation 3]

In Equation 3, $K_{PUSCH}$ is a value determined according to uplink/downlink frame configuration. For example, for frequency division duplexing (FDD), in which one frame is composed of uplink subframes only or downlink subframes only in a predetermined frequency band, $K_{PUSCH}=4$. For time division duplexing (TDD), in which one frame is composed of both an uplink subframe and a downlink subframe in predetermined frequency bandwidth, frame configuration varies with the ratio of uplink (UL) subframes to downlink (DL) subframes. For TDD, $K_{PUSCH}$ may be given as follows according to, for example, TDD UL/DL configuration.

TABLE 1

| TDD UL/DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In Equation 2, $\delta_{PUSCH}$ is a UE-specific correction value, also referred to as a transmit power control (TPC) command. $\delta_{PUSCH}$ is included in a PDCCH of DCI format 0 or is jointly coded with other TPC commands in a PDCCH of DCI format 3/3A. For example, $\delta_{PUSCH}(i-K_{PUSCH})$ may be a value signaled on a PDCCH of downlink control information (DCI) format 0 or 3/3A in subframe $i-K_{PUSCH}$. If accumulation of $\delta_{PUSCH}$ is enabled by higher layers, f(0) is the first value after reset of accumulation. If accumulation of $\delta_{PUSCH}$ is disabled by higher layers, then f(i)=f(i−1). According to the number of bits for a TPC command, $\delta_{PUSCH}$ may be defined as shown in Table 1 and Table 2. Table 2 may be used when two bits are used for a TPC command in DCI format 0/3 and Table 3 may be used when one bit is used for a TPC command in DCI format 3A.

TABLE 2

| TPC Command Field in DCI format 0/3 | Accumulated $\delta_{PUSCH}$ [dB] | Absolute $\delta_{PUSCH}$ [dB] only DCI format 0 |
|---|---|---|
| 0 | −1 | −4 |
| 1 | 0 | −1 |
| 2 | 1 | 1 |
| 3 | 3 | 4 |

TABLE 3

| TPC Command Field in DCI format 3A | Accumulated $\delta_{PUSCH}$ [dB] |
|---|---|
| 0 | −1 |
| 1 | 1 |

In Equation 2, PL denotes DL pathloss estimated by the UE in dB and α·PL is for pathloss correction. For j=0 or 1, α is a 3-bit cell-specific parameter provided by higher layers having one value among {0, 0.4, 0.5, 0.6, 0.7, 0.8, 0.9, 1}. For j=2, α(j)=1. If α equals 1, this means that downlink pathloss is completely reflected in uplink transmit power and, if α is less than 1, this means that downlink pathloss is partially reflected in uplink transmit power. While α of a legacy 3GPP LTE(-A) system is a cell-specific weight, downlink pathloss in a DMNS varies with the UE. Hence, pathloss cannot be accurately reflected in uplink transmit power by the cell-specific weight α.

To solve such a problem, a BS of the present invention may provide a weight α', which is a UE-specific parameter, to the UE through higher layer signaling, separately from the cell-specific weight α. A legacy UE calculates uplink transmit power using the cell-specific weight α according to a legacy scheme (e.g. Equation 2) and a DMNS UE calculates uplink transmit power using the cell-specific weight α and the UE-specific weight α'. For example, the DMNS UE may calculate uplink transmit power for PUSCH transmission based on the following equation.

$$P_{PUSCH}=\min\{P_{CMAX}, A+\alpha\cdot\alpha'\cdot PL\}$$ [Equation 4]

In Equation 4, α' may be a value varying depending on j. For example, for j=2, α'(j)=0 is defined and, for j=0 or 1, α'∈{0, 1, 2, 3, 4, 5, 6, 7, 8, 9, 10, 12, 13, 14, 15} (dB) is defined. In this case, for j=0 or 1, α' is a 4-bit UE-specific parameter provided by higher layers. α' may be expressed as a linear value.

The BS may provide the new UE-specific weight α' replacing the cell-specific weight α of the legacy 3GPP LTE(-A) system to the DMNS UE through higher layer signaling. For example, the DMNS UE may calculate uplink transmit power for PUSCH transmission based on the following equation.

$$P_{PUSCH}=\min\{P_{CMAX}, A+\alpha'\cdot PL\}$$ [Equation 5]

In Equation 5, the range of α' may be defined in consideration of x (where x is a real number or integer greater than 1) in addition to values defined for the existing value α. For example, for j=2, α'(j)=0 is defined and, for j=0 or 1, α'∈{0, 0.4, 0.5, 0.6, 0.7, 0.8, 0.9, 1.0, 1.3, 1.6, 2.0, 3.2, 4.0, 5.0, 6.3, 7.9, 10.0, 12.6, 15.8, 20.0, 25.1, 31.6} (dB) is defined. In this case, for j=0 or 1, α' is a 7-bit UE-specific parameter provided by higher layers.

In Equations 4 and 5, the unit of $P_{PUSCH}$ is dBm and A may correspond to "10 $\log_{10}(M_{PUSCH}(i))+P_{O\_PUSCH}(j)+\Delta_{TF}(i)+f(i)$" of Equation 2.

The legacy weight α, which is commonly applied to all UEs in a cell, may be transmitted as uplink power control common (UplinkPowerControlCommon) information in an uplink power control (UplinkPowerControl) message and the UE-specific weight α' of the present invention may be transmitted as uplink power control dedicated (UplinkPowerControlDedicated) information in the uplink power control (UplinkPowerControl) message.

While an example of applying the present invention has been described hereinabove by way of example of transmit power for PUSCH transmission, the present invention is also applicable in the same manner to transmit power calculation for transmitting other uplink channels (e.g. PUCCH, SRS, etc.).

<IEEE 802.16 System>

In the IEEE 802.16 system, uplink power control is supported for initial calibration and periodic adjustment on transmit power without data loss. An uplink power control algorithm determines the transmit power of each OFDM symbol per subcarrier to compensate for pathloss, shadowing, and fast fading. In addition, uplink power control serves to control an inter-cell interference level. A legacy UE of the IEEE 802.16 system determines a transmit power level (dBm) per stream and per subcarrier for current transmission according to the following equation.

$$P = L + SINR_{Target} + NI + \text{offset} \quad \text{[Equation 6]}$$

In Equation 6, L corresponds to PL of Equation 2 and is an estimated average current downlink propagation loss, calculated by the UE and includes pathloss PL and transmit antenna gain of the UE. L may be calculated based on total power received on active subcarriers of a preamble or a reference signal (RS). NI is a power parameter provided by the BS and denotes an estimated average power level (dBm) of noise and interference per subcarrier at the BS. In Equation 6, offset is an adjustment value for a UE-specific power offset and is controlled by the BS through a power control message. Two offset values used for data and control signals are defined. For example, for data channel transmission, offset of Equation 6 is set to Offset$_{Data}$ transmitted by the BS and, for control channel transmission, offset is set to Offset$_{Control}$ transmitted by the BS. In Equation 6, SINR$_{TARGET}$ is a target uplink SINR received by the BS. For data channel transmission, SINR$_{TARGET}$ is calculated as follows.

$$SINR_{Target} = \quad \text{[Equation 7]}$$
$$10\log 10\left(\max\left(10^{\wedge}\left(\frac{SINR_{MIN}(dB)}{10}\right), \gamma_{IoT} \times SIR_{DL} - \varepsilon\right)\right) - \beta \cdot 10\log 10(TNS)$$

In Equation 7, SINR$_{TARGET}$ is a target SINR value for IoT (Interference plus noise over Thermal noise) control and tradeoff between overall system throughput and cell edge performance, decided by a control parameter and SINR$_{MIN}$ (dB). SINR$_{MIN}$(dB) is an SINR requirement for a minimum data rate expected by the BS, $\gamma_{IoT}$ is a fairness and IoT control factor. SIR$_{DL}$ is a linear ratio of a downlink signal to interference power, measured by a corresponding UE. $\varepsilon$ is a factor according to the number of receive antennas and is provided to the UE by media access control (MAC) power control signaling and $\beta$ is a factor for determining influence of a total number of streams (TNS) for SINR$_{TARGET}$. $\beta$ may be determined by the BS and may be transmitted to the UE. TNS is a total number of streams in a logical resource unit (LRU) indicated by uplink MAP information and may be unicast to a corresponding UE by the BS. In the case of single-user MIMO (SU-MIMO), TNS is set to a number of streams for the UE and, in the case of collaborative spatial multiplexing (CSM), TNS corresponds to an aggregated number of streams. If the calculated data channel SINR$_{TARGET}$ is higher than a maximum SINR threshold expected by the BS, signaled by the BS, SINR$_{TARGET}$ is set to the maximum SINR threshold.

As can be appreciated with reference to Equation 6, the downlink propagation loss L is reflected in uplink transmit power. However, since it is not guaranteed that downlink propagation loss (or pathloss) is always equal to uplink propagation loss (or pathloss) and downlink pathloss in a DMNS varies according to the UE, the BS of the present invention may provide the UE-specific parameter $\alpha'$ to the DMNS UE as a weight for L. The legacy UE calculates uplink transmit power according to the legacy scheme (e.g. Equation 6) without applying the weight to L and the DMNS UE may calculate uplink transmit power using the cell-specific weight $\alpha'$. For example, the DMNS UE may calculate uplink transmit power for current transmission using the following equation.

$$P = \alpha' \cdot P + A \quad \text{[Equation 8]}$$

In Equation 8, the unit of P may be dBm and A may correspond to "SINR$_{Target}$+NI+offset" of Equation 6.

As indicated in the following Equation 9 or 10, the present invention may be applied to SINR$_{Target}$.

$$SINR_{Target} = 10\log 10 \quad \text{[Equation 9]}$$
$$\left(\max\left(10^{\wedge}\left(\frac{SINR_{MIN}(dB)}{10}\right), \gamma_{IoT} \times SIR_{DL} - \varepsilon \cdot \alpha'\right)\right) - \beta \cdot 10\log 10(TNS)$$

$$SINR_{Target} = 10\log 10 \quad \text{[Equation 10]}$$
$$\left(\max\left(10^{\wedge}\left(\frac{SINR_{MIN}(dB)}{10}\right), \gamma_{IoT} \times SIR_{DL} - \varepsilon - \alpha'\right)\right) - \beta \cdot 10\log 10(TNS)$$

In Equations 8, 9, and 10, $\alpha'$ may be a UE-specific parameter in dB. For example, $\alpha' \in \{0, 1, 2, 3, 4, 5, 6, 7, 8, 9, 10, 12, 13, 14, 15\}$ (dB) may be defined.

Figure 5:
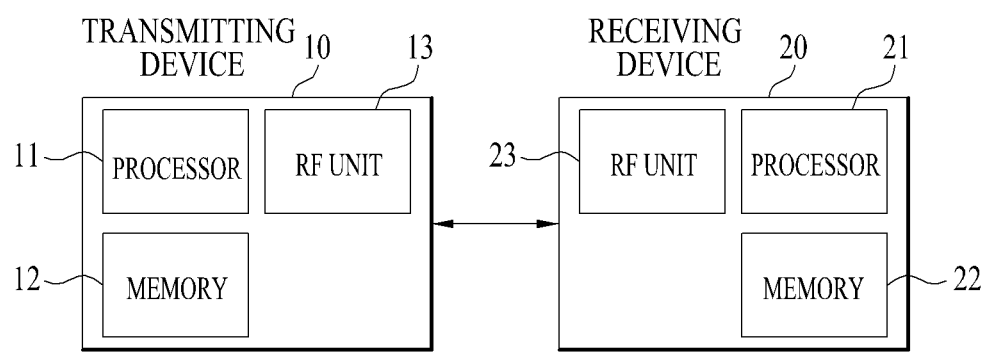
FIG. 5 is a block diagram illustrating elements of a transmitting device 10 and a receiving device 20 for implementing the present invention.

FIG. 5 is a block diagram illustrating elements of a transmitting device 10 and a receiving device 20 for implementing the present invention.

The transmitting device 10 and the receiver 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiver. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. If the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiver in the form of one or more layers. For frequency up-conversion, the RF unit 13 may include an oscillator. The RF unit 13 may include $N_t$ (where $N_t$ is a positive integer) transmit antennas.

A signal processing process of the receiver 20 is the reverse of the signal processing process of the transmitting device 10. Under control of the processor 21, the RF unit 23 of the receiver 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted in correspondence to a corresponding antenna defines an antenna viewed from the receiver 20 and enables the receiver 20 to perform channel estimation for the antenna, irrespective of whether it is a single radio channel from one physical antenna or a composite channel from a plurality of physical antenna elements including the antenna. In other words, the antenna is defined such that a channel carrying a symbol of the antenna may be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in uplink and as the receiver 20 in downlink. In the embodiments of the present invention, a BS operates as the receiver 20 in uplink and as the transmitting device 10 in downlink. Hereinafter, the processor, memory, and RF unit included in the BS will be referred to as a BS processor, a BS memory, and a BS RF unit, respectively and the processor, memory, and RF unit included in the UE will be referred to as a UE processor, a UE memory, and a UE RF unit, respectively to describe the embodiments of the present invention. In the present invention, the BS processor may be a processor in the BS or a BS controller connected to the BS via cables or dedicated lines to control the BS. The BS RF unit may be included in a node at which the BS is located (e.g. Node 1 of FIGS. 3 and 4) or may be included in a distributed node.

In a DMNS, the BS processor may configure uplink power control information including a UE-specific weight $\alpha'$ to be applied to pathloss or propagation loss and control the BS RF unit to transmit the uplink power control information to the UE. The UE-specific weight $\alpha'$ is a newly defined pathloss weight for a DMNS UE and has a value equal to or greater than 0. The UE-specific weight $\alpha'$ may be used together with a cell-specific weight $\alpha$ or may be used instead of the cell-specific weight. In a system using $\alpha'$ together with $\alpha$, the BS processor may configure the uplink power control information including both $\alpha'$ and $\alpha$ or may separately configure the uplink power control information including $\alpha$ and the uplink power control information including $\alpha'$.

The UE processor may measure/estimate pathloss or propagation loss using a downlink RS. The UE processor controls the UE RF unit to receive the uplink power control information including $\alpha'$ (and/or $\alpha$) from the BS. The UE processor may apply the UE-specific weight $\alpha'$ to the pathloss or propagation loss to determine uplink transmit power based on the pathloss/propagation loss to which the UE-specific weight $\alpha'$ is applied. For example, the UE processor may be configured to determine the uplink transmit power using any one of Equations 1, 4, 5, 8, 9, and 10. The UE processor controls the UE RF unit to perform uplink transmission to the BS at the determined uplink transmit power.

The BS processor may control the BS RF unit to receive uplink transmission from the UE and (re)determine parameters for uplink power control of the UE based on received strength of uplink transmission. The BS processor may configure uplink power control information including the parameters and control the BS RF unit to transmit the uplink power control information to the UE.

According to the present invention, since a pathloss estimation error for a plurality of uplink serving nodes in a multi-node system is reduced, uplink transmit power can be more accurately controlled.

The detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for determining power for uplink transmission to a base station by a user equipment for simultaneously transmitting signals to a plurality of nodes, the method comprising:
    receiving uplink power control information from the base station; and
    determining an uplink transmit power P based on the uplink power control information,
    wherein the uplink power control information includes a cell-specific weight and a user equipment-specific weight applied to downlink pathloss of the plurality of nodes, and wherein the uplink transmit power P is determined based on a following Equation 1 or Equation 2:

$$P = \min\{PCMAX, A + \alpha \cdot \alpha' \cdot PL\} \text{ (dBm)} \qquad \text{Equation 1}$$

$$P = \alpha' \cdot L + B \text{ (dBm)} \qquad \text{Equation 2}$$

wherein, in Equation 1, A is a value determined based on one or more power control parameters provided by the base station, PL is the downlink pathloss measured by the user equipment, $\alpha$ is the cell-specific weight, and $\alpha'$ is the user equipment-specific weight and, in Equation 2, P is a transmit power of an uplink data channel, L corresponds to downlink propagation loss including the downlink pathloss, calculated by the user equipment, $\alpha'$ is the user equipment-specific weight, and B is a value determined based on one or more power control parameters provided by the base station.

2. A user equipment for determining power for uplink transmission to a base station, the user equipment simultaneously transmitting signals to a plurality of nodes and comprising:
   a radio frequency (RF) unit configured to transmit and receive radio signals; and
   a processor configured to control the RF unit,
   wherein the processor controls the RF unit to receive uplink power control information from the base station and determines an uplink transmit power P based on the uplink power control information, and
   wherein the uplink power control information includes a cell-specific weight and a user equipment-specific weight applied to downlink pathloss of the plurality of nodes, and
   wherein the processor is configured to determine the uplink transmit power P based on a following Equation 1 or Equation 2:

$$P = \min\{PCMAX, A + \alpha \cdot \alpha' \cdot PL\} \text{ (dBm)} \qquad \text{Equation 1}$$

$$P = \alpha' \cdot L + B \text{ (dBm)} \qquad \text{Equation 2}$$

wherein, in Equation 1, A is a value determined based on one or more power control parameters provided by the base station, PL is the downlink pathloss measured by the user equipment, $\alpha$ is the cell-specific weight, and $\alpha'$ is the user equipment-specific weight and, in Equation 2, P is a transmit power of an uplink data channel, L corresponds to downlink propagation loss including the downlink pathloss, calculated by the user equipment, $\alpha'$ is the user equipment-specific weight, and B is a value determined based on one or more power control parameters provided by the base station.

* * * * *